United States Patent
Pennington

[15] 3,706,331
[45] Dec. 19, 1972

[54] METALLIC CAGE STRUCTURE AND APPARATUS FOR MANUFACTURING SAME

[72] Inventor: John Stanley Pennington, Retford, England

[73] Assignee: British Steel Corporation, London, England

[22] Filed: Jan. 5, 1971

[21] Appl. No.: 104,076

[30] Foreign Application Priority Data

Jan. 9, 1970 Great Britain.................... 1,144/70

[52] U.S. Cl. .................................. 140/112, 219/56
[51] Int. Cl. ........................................ B21f 27/10
[58] Field of Search ................. 140/112; 219/56

[56] References Cited

UNITED STATES PATENTS

| | | | |
|---|---|---|---|
| 3,233,638 | 2/1966 | Silliman et al. | 140/112 |
| 3,437,114 | 4/1969 | Whitacre et al. | 140/112 |

Primary Examiner—Lowell A. Larson
Attorney—Bacon & Thomas

[57] ABSTRACT

A metallic cage for use in reinforcing concrete comprises a number of straight parallel bars and a wire helically wound around the bars and welded to the bars at the points of contact. The cage is made on an apparatus comprising a drive unit for propelling forward the parallel bars, a wiring unit for wrapping the bars with wire, and a welding unit for welding the wire to the bars where they cross. The wiring unit suitably comprises a circular frame surrounding the bars and carrying a spool, which is braked to keep the wire taut. The welding unit can include resistance weld guns movable with the cage.

7 Claims, 6 Drawing Figures

METALLIC CAGE STRUCTURE AND APPARATUS FOR MANUFACTURING SAME

This invention relates to metallic cage structures and to apparatus for making these structures. More particularly, this invention is concerned with such structures employed in reinforcing concrete columns, piles, beams and the like.

Hitherto, in constructing cage structures for use in the manner described, a number of parallel spaced reinforcing bars have been supported in a particular configuration and a multiplicity of individual wire or rod links have been spaced apart along the length of the bars and tied by wires to these bars at their points of contact. The links may be bent into the shape of a circle, square, rectangle, trapezoid, etc., in dependence on the configuration required of the bars so that the bars and the links together form a cage of the required cross-section.

Manufacture of cage structures in this manner entails a considerable amount of manual work and is in consequence a slow and costly operation; further, the end result can by highly inaccurate. In particular, the inaccuracies which can be incurred by site assembly of these cages can be such that additional tolerances have to be allowed for to maintain the necessary concrete cover and attempts at factory assembly of cages by manual means present further difficulties in transport and handling due to lack of rigidity which is inherent with these methods.

It is an object of this invention to provide an improved cage structure and apparatus for making the same.

From one aspect the present invention provides a metallic cage structure comprising a plurality of parallel spaced bars and a wire helically wound around all the bars together and welded thereto at its points of contact.

From another aspect the present invention consists in apparatus for manufacturing a cage structure comprising means for receiving a plurality of bars and together propelling them in a parallel spaced configuration firstly through a wiring unit and then through a welding unit, the wiring unit being operative to encircle all the bars with wire and the welding unit being operative to weld the wire to the bars at their mutual points of contact.

Since the bars are propelled through the wiring unit as the wire is encircled around them, the wire defines a helical path along the bars and the welding unit includes a plurality of welding guns, equal in number to the number of bars, which weld the wires to the bars at each point of mutual contact between them all the guns being operable simultaneously on each complete turn of the wire helix.

The wire may be tightly drawn against the bars so that the resulting cage cross-section defines a polygonal boundary, e.g. four bars enveloped by the wire may be defined either as a square, a rectangle, or a trapezium. Three bars or more than four bars may alternatively be employed of course.

The bars may be of any cross-section and may be plain, deformed or indented in an as-rolled, cold-worked, drawn or twisted condition; further, they may not necessarily all be of the same section. The bars may be made from mild steel or high yield quality steel and may, for example, be between 5 mm. and 50 mm. in diameter. The enveloping wire may also be a mild or a high yield quality steel, (e.g. between 5 mm. and 12 mm. in diameter) and it may be employed in the cold-worked, as-rolled or hard drawn condition.

Factory pre-assembled cages made in the manner described are extremely rigid and can be handled, transported and stacked without damage and with the minimal use of equipment. Clearly, the elimination of slow and costly manual work on site and the resulting speeding up of the work will realize economies in reinforced concrete constructions. Other sequential economies are apparent, e.g. the automatically produced cage is dimensionally more accurate leading to economies in construction and design; the continuous helical binding realizes a saving in steel when compared with the conventional links since the overlaps at the ends of the links are eliminated, also, some of the overlap type anchorages are not so positive as the continuous binding.

In order that the invention may be fully understood one embodiment thereof will now be described with reference to the accompanying drawings in which.

Figure 1:
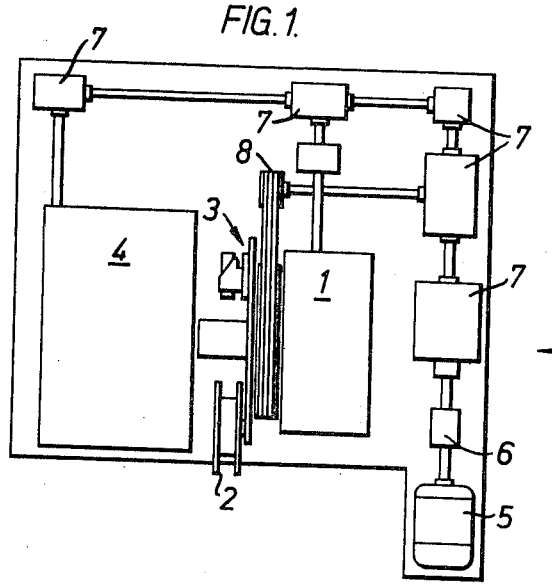
FIG. 1 illustrates a schematic plan view of the principal features of apparatus according to this invention.

Referring now to FIG. 1 a number of bars, e.g. four arranged at the corners of a square, are fed to the apparatus in the direction of the arrow on a conveyor (not shown). The bars are received by a pinch roll drive unit 1 which accurately defines their orientation, and as they issue they are encircled by wire from a coil 2 in a rotatable wire "wrapping" unit 3. Since the bars are moving axially the wire is tightly wrapped around them along a helical path and the composite structure then enters a welding unit 4 in which the wire is welded to the bars at each point of contact, thus completing the cage as it issues from the apparatus.

The drive to the various parts of this apparatus is effected from a single electric motor 5 through a magnetic clutch 6 and a series of gear boxes 7, a chain drive 8 being provided for the wrapping unit.

Figure 2:
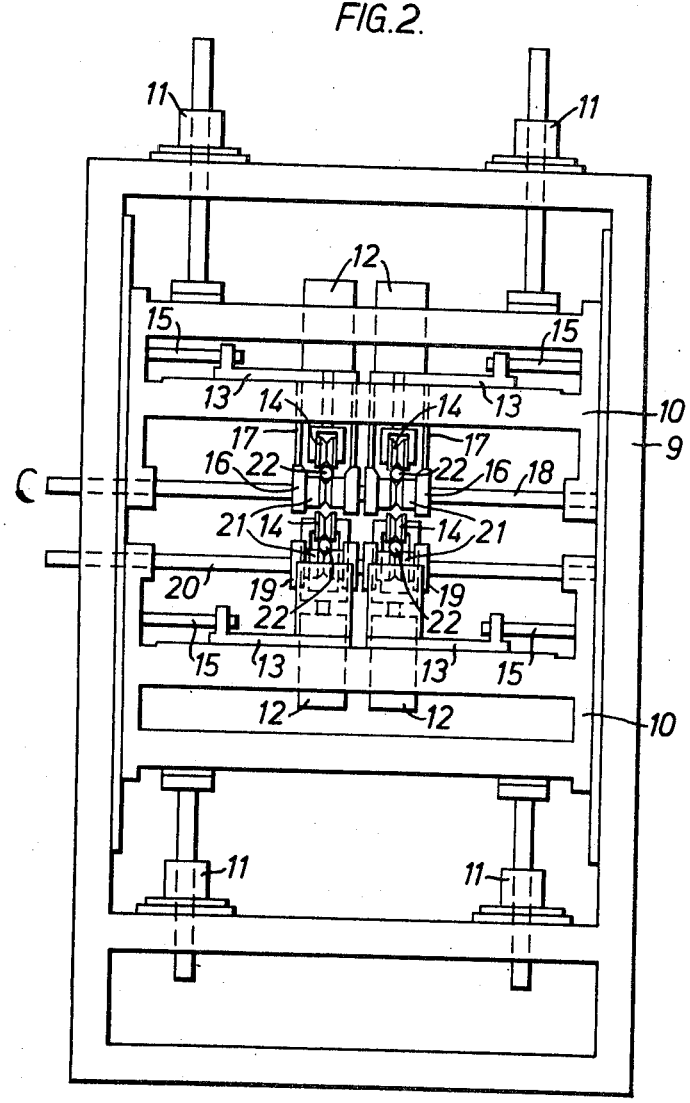
FIG. 2 illustrates an end elevation of the "driving" unit in the direction of drive with four bars arranged at the corners of a square.

Referring now to FIG. 2 the pinch roll drive unit 1 is shown in more detail. This unit comprises a rigid frame 9 in which are mounted two crossheads 10 vertically movable within the frame by screw jacks 11.

Four pneumatically powered rams 12 are mounted on slides 13 on the crossheads, two rams and their associated slides being mounted on each crosshead. Each ram has a piston which terminates in a shaped roller 14 and each is individually slidable transversely of the cross-head by screws 15. Secured to the upper slides are bearings 16, these bearings being carried on arms 17 depending from the slides and being additionally supported by a rotatable shaft 18. Similarly, bearings 19 are secured to the lower slides, through the housing of the lower rams 12, and are supported by a rotatable shaft 20. The bearings 16, 19 each carry knurled pinch rolls 21 and these are keyed to their respective shafts 18, 20 so that they rotate with them.

With this construction the bars, shown at 22 between the rollers, are driven forwardly by these rollers and since the clamping pressure is applied to the bars from the ram rollers against the reaction of the fixed bearing 16, 19 there is no net pressure applied to the supporting shafts.

By vertically moving the crossheads and by horizontally moving the slides any desired position of the bars can be accommodated within the limits of the frame.

Figure 3:
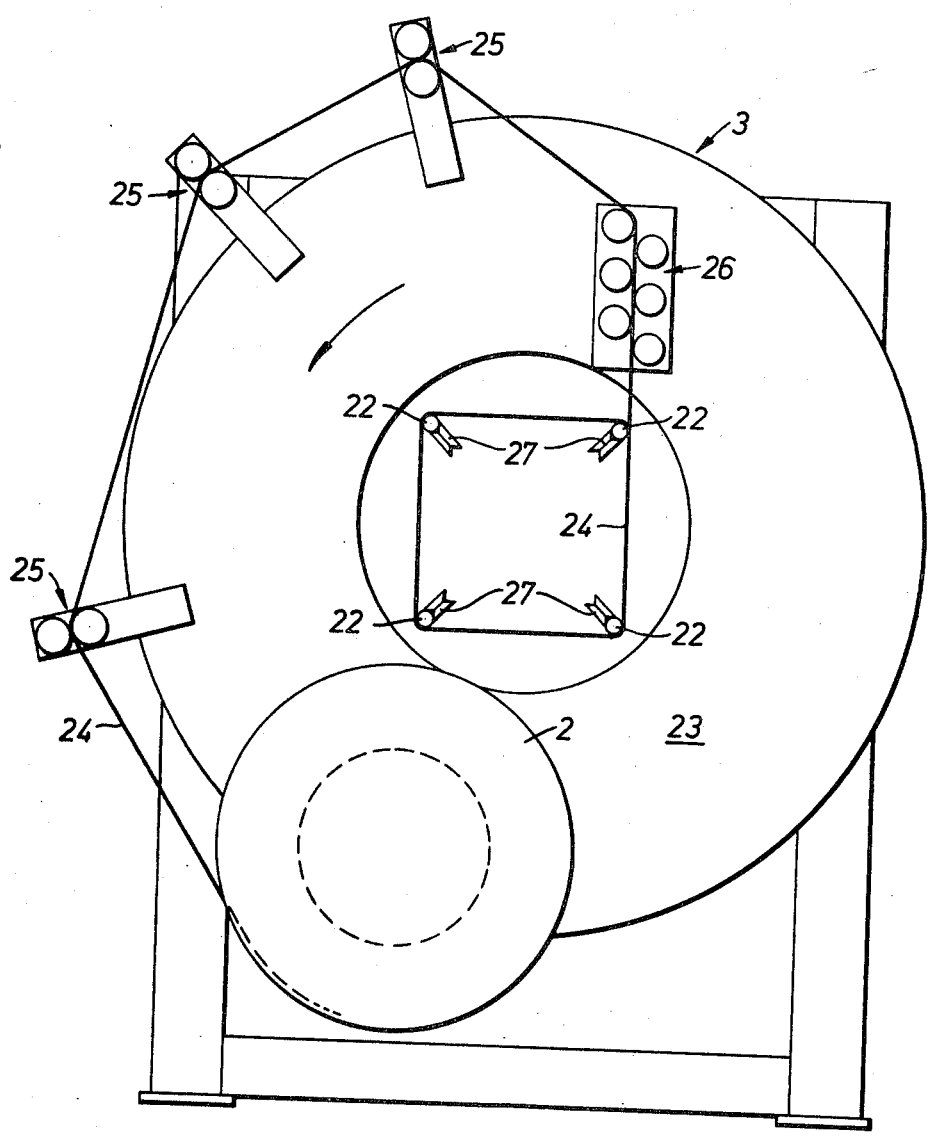
FIG. 3 is an end elevation of the wiring unit.

The wire wrapping unit shown in FIG. 3 comprises a rotatable frame 23 which carries the spool 2 for wire 24, a number of spaced guide rollers and a set of straightening rollers 26. The frame has a central aperture through which the bars 22 are propelled by the pinch roll drive unit described, and they are supported by vee-shaped rollers 27 mounted in an auxiliary fixed frame, not shown. These rollers are adjustable to accommodate any bar configuration.

Thus, as the frame rotates in the direction of the arrow, the wire is paid off the reel and is wound in a helical fashion around the bars as they are driven forwardly by the pinch rolls. The speed at which these pinch rolls rotate is synchronized with the rotational speed of the wrapping frame so as to generate any pitch desired.

The rotating frame is provided with a brake and a constant brake load is also applied to the spool to prevent it unwinding due to the "spring" in the coiled wire. The brake load on the spool also serves to keep the wire taut to form a polygonal cage.

The reinforcing cage thus formed with the wrapping wire tightly coiled around the bars is then passed to the welding unit still supported by the rollers 27.

Figure 4:
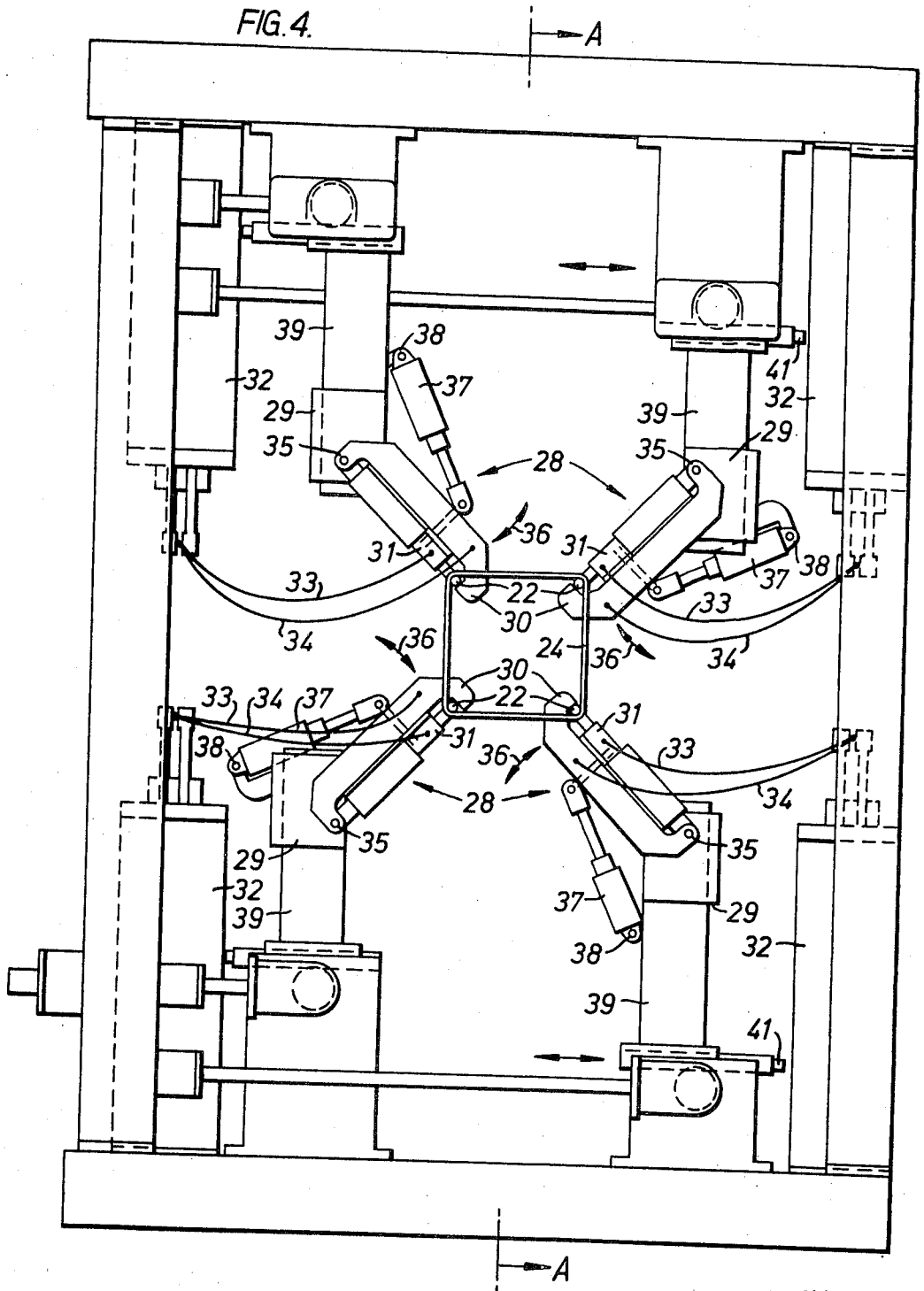
FIG. 4 is an end elevation of the welding unit.
Figure 5:
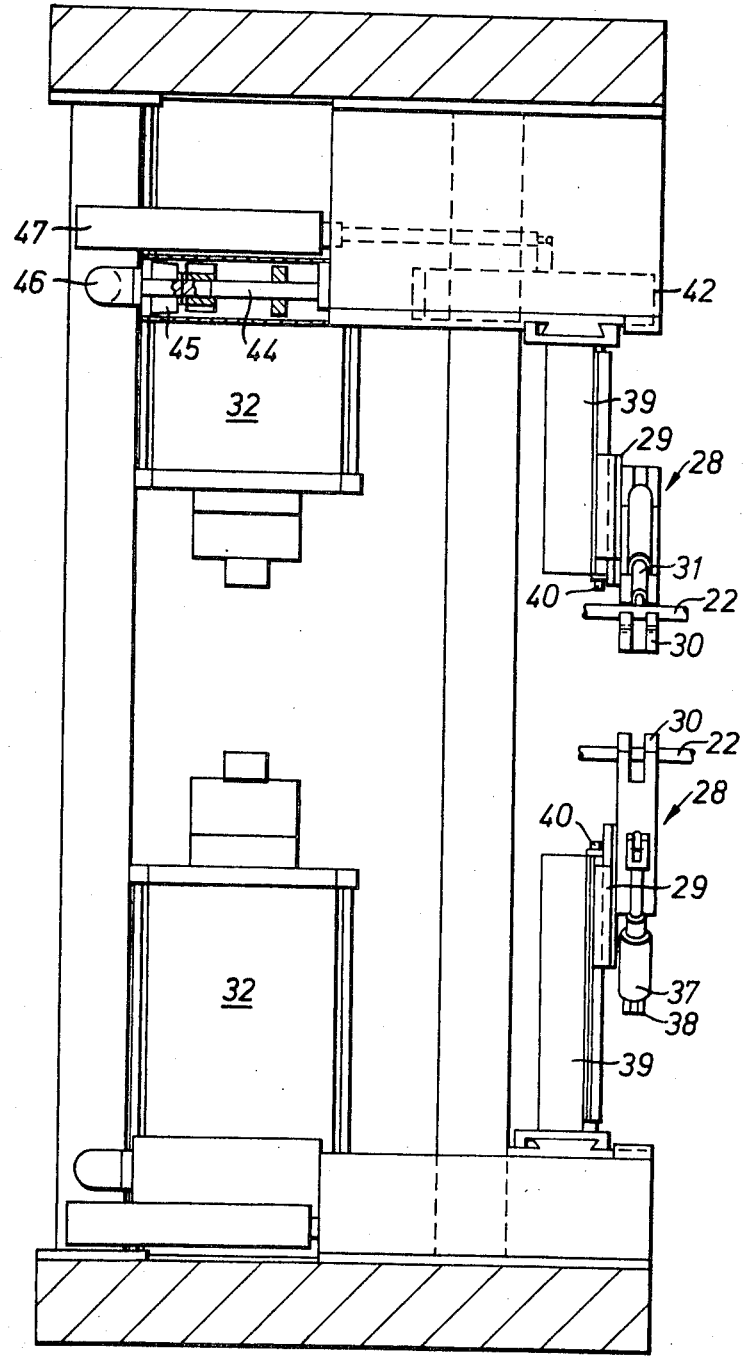
FIG. 5 is a sectional view through A—A in FIG. 4.

This unit is shown in FIGS. 4 and 5 and is provided with four hydraulically operated weld guns 28. Each gun is supported on a carriage 29 and they are all alike apart from their positional attitudes, consisting essentially of a bifurcated anvil 30 and a hydraulically operated jaw 31 so that together they only exert a light squeezing pressure on the bar and the wire at their point of mutual contact. The electric current for each gun is supplied from a transformer 32 via flexible cables 33, 34 connected across the anvil/jaw.

The guns are pivoted to their carriages at 35 and each is constrained to move in an arc as shown by the arrows 36 in response to the operation of pneumatic or other fluid powered rams 37, which, in turn, are pivoted at 38 to the carriages. The weld guns 28 are each pivotally movable by a ram 37 between a withdrawn position (not illustrated) and an operative position shown in which the enveloping wire 24 passes between the bifurcations of the anvil 30.

The carriage 29 is arranged to slide vertically on a further carriage 39 which, in turn, is arranged to slide horizontally in the direction of the arrows perpendicularly to the axis of the cage, the positional adjustments of these carriages being effected by leadscrews 40 and 41 respectively.

Further, the carriage 39 is attached to an additional carriage 42 which is arranged to slide horizontally in a direction parallel to the axis of the cage, movement of this latter carriage being effected by a leadscrew 44 driven via an electro-magnetic clutch 45 from a constantly rotating gear drive 46. All the angled gear drives for each gun assembly, that is, the vertical drive and the two horizontal drives, are interconnected and simultaneously driven in synchronism with the remainder of the apparatus.

In particular, while the guns were in contact with the cage and travelling with it, as illustrated, electric current is fed across the jaws/anvil and the wrapping wire is resistance welded to the bars 22. Rapid return of the gun assemblies to their original positions is achieved by actuating an air cylinder 47 and simultaneously disengaging the clutch 45.

Any desired sequence of operation of the apparatus may be effected from an electrical control panel (not shown).

Figure 6:
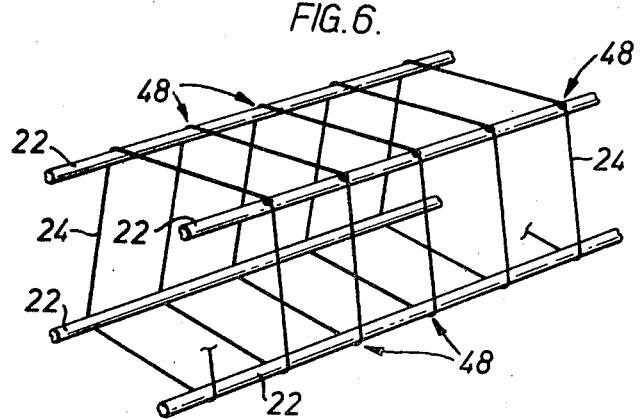
FIG. 6 is a perspective view of a cage formed on the above apparatus.

A typical cage produced by this apparatus is illustrated in FIG. 6, the wire 24 being welded to the bars 22 at 48.

Although this apparatus and the cage produced thereby has been described with reference to a particular embodiment it is to be understood that many modifications may be effected without departing from the scope of this invention. For example, the cage chosen to be illustrated, i.e. comprising four bars arranged in the form of a square, has been selected merely for convenience and three bar cages or cages including five or more bars may equally well be constructed. Further, although the cage illustrated has an enveloping wire with a constant pitch, cages having varying pitches may equally well be constructed with this apparatus. In addition, cages more complex than those described can be manufactured by initially making a basic cage structure and then adding other bars, either straight or bent, in a subsequent operation. Protruding bars may be bent after fabrication of the cage to form connections with other reinforcements.

Further, various other control functions may be effected by the apparatus described, e.g. the apparatus could be automatically stopped prior to the welding operation if the cage were not correctly formed at their stage. Numerical control for fully automatic operations could also be incorporated.

I claim:

1. Apparatus for manufacturing a metallic cage structure for reinforcing concrete, comprising a support member carrying:
   i. a drive unit for receiving a plurality of bars and together propelling them horizontally forward in parallel spaced configuration through a vertical frame constituting part of said support member, said drive unit comprising a plurality of first support means carried on said frame and each being independently adjustable for position in a first direction perpendicular to the line of advancement of the bars, a plurality of second support means carried on said first support means and each independently adjustable for position relative to said first support means in a second direction perpendicular to the line of advancement of the bars and perpendicular to the said first direction, each of said second support means carrying location and forward drive means for a bar;
   ii. a wiring unit downstream of said drive unit and operative to tightly coil around all the bars a helix of wire in substantially straight runs between bars;

iii. a welding unit downstream of and separated from said wiring unit operative to weld the wire to the bars at their mutual points of contact, said welding unit comprising a vertical frame constituting part of said support member carrying a plurality of carriages having mounted thereon weld guns adjustable for position across the line of advance of the bars, means for driving forward each carriage and associated weld gun in synchronism with the bars during each welding operation, and means for rapidly driving backward each carriage and associated weld gun after each welding operation in readiness for a subsequent operation.

2. Apparatus as claimed in claim 1 in which the wiring unit comprises a frame rotatably mounted on the support member and having a central aperture around the path of the bars, and a spool of wire rotatably mounted on the frame whereby wire is paid off the spool and wound about all the bars as the frame rotates.

3. Apparatus as claimed in claim 2 in which a brake load is applied to the spool to maintain a tension in the wire during rotation of said rotatably mounted frame.

4. Apparatus as claimed in claim 2 in which the wiring unit is provided with a drive mechanism for the rotatable frame which is synchronized with the unit for propelling the bars forward.

5. Apparatus as claimed in claim 1 in which the weld guns are resistance weld guns each comprising a jaw cooperating with a bifurcated anvil, each gun being pivotally mounted on its associated carriage such that the gun is pivotable between a withdrawn position and an operative position in which the enveloping wire passes between the bifurcations of the anvil and crosses a bar between the anvil and the jaw.

6. Apparatus as claimed in claim 5 wherein the means for driving forward each carriage and associated weld gun in synchronism with the bars comprises a leadscrew driven through a clutch from a gear drive driven in synchronism with the forward drive means for the bars.

7. Apparatus as claimed in claim 6 wherein the means for rapidly driving backward each carriage and associated weld gun comprises means for disengaging said clutch and actuating an air cylinder acting between the carriage and the support member.

* * * * *